United States Patent
Rainy (10) Patent No.: US 10,825,132 B2
(45) Date of Patent: Nov. 3, 2020

(54) TRAINING METHOD FOR CONVOLUTIONAL NEURAL NETWORKS FOR USE IN ARTISTIC STYLE TRANSFERS FOR VIDEO

(71) Applicant: ELEMENT AI INC., Montreal (CA)

(72) Inventor: Jeffrey Rainy, Montreal (CA)

(73) Assignee: ELEMENT AI INC., Montreal (CA)

( * ) Notice: Subject to any disclaimer, the term of this patent is extended or adjusted under 35 U.S.C. 154(b) by 181 days.

(21) Appl. No.: 15/899,697

(22) Filed: Feb. 20, 2018

(65) Prior Publication Data

US 2019/0259134 A1 Aug. 22, 2019

(51) Int. Cl.
  *G06T 3/00* (2006.01)
  *G06N 3/08* (2006.01)
  *G06N 3/04* (2006.01)

(52) U.S. Cl.
  CPC .............. *G06T 3/0056* (2013.01); *G06N 3/04* (2013.01); *G06N 3/08* (2013.01); *G06T 2207/20081* (2013.01)

(58) Field of Classification Search
  CPC ........ G06T 3/0056; G06T 2207/20081; G06N 3/04; G06N 3/08
  See application file for complete search history.

(56) References Cited

U.S. PATENT DOCUMENTS

| 8,775,341 | B1 * | 7/2014 | Commons | G10L 15/16 706/20 |
| 10,032,256 | B1 * | 7/2018 | Anaya | G06T 5/002 |
| 10,049,297 | B1 * | 8/2018 | Chen | G06K 9/00691 |
| 2013/0054297 | A1 * | 2/2013 | Gagnon | G06Q 30/06 705/7.25 |
| 2017/0256038 | A1 * | 9/2017 | Lee | G06T 5/005 |
| 2017/0372505 | A1 * | 12/2017 | Bhat | G06T 7/11 |
| 2018/0068463 | A1 * | 3/2018 | Risser | G06T 11/001 |
| 2018/0173979 | A1 * | 6/2018 | Fan | G06K 9/2036 |
| 2018/0240257 | A1 * | 8/2018 | Li | G06T 11/001 |
| 2019/0065908 | A1 * | 2/2019 | Lee | G06K 9/6262 |

(Continued)

OTHER PUBLICATIONS

Google Scholar Search results.*

(Continued)

*Primary Examiner* — Qun Shen
(74) *Attorney, Agent, or Firm* — Fasken Martineau DuMoulin LLP (57) ABSTRACT

Systems and methods for use in training a convolutional neural network (CNN) for image and video transformations. The CNN is trained by adding noise to training data set images, transforming both the noisy image and the source image, and then determining the difference between the transformed noisy image and the transformed source image. The CNN is further trained by using an object classifier network and noting the node activation levels within that classifier network when transformed images (from the CNN) are classified. By iteratively adjusting the CNN to minimize a combined loss function that includes the differences between the node activation levels for the transformed references images and when transformed source are classified and the differences between the transformed noisy image and the transformed source image, the artistic style being transferred is maintained in the transformed images.

23 Claims, 8 Drawing Sheets

(56) References Cited

U.S. PATENT DOCUMENTS

2019/0095629 A1* 3/2019 Lee .................. G06Q 10/06

OTHER PUBLICATIONS

Leon, A., et al. "A Neural Algorithm of Artistic Style." [1402.1128] Long Short-Term Memory Based Recurrent Neural Network Architectures for Large Vocabulary Speech Recognition, Sep. 2, 2015, arxiv.org/abs/1508.06576.
"Jcjohnson/Neural-Style." GitHub, Apr. 15, 2017, github.com/jcjohnson/neural-style.
"Deep Learning Helps Transfer Famous Artistic Styles to Videos." NVIDIA Developer News Center, Oct. 2, 2017, news.developer.nvidia.com/deep-learning-helps-transfer-famous-artistic-styles-to-videos/.
"Deep Learning Paints Videos in Style of Art Masters | NVIDIA Blog." The Official NVIDIA Blog, Jul. 6, 2017, blogs.nvidia.com/blog/2016/05/25/deep-learning-paints-videos/.
"Genekogan/CubistMirror." GitHub, github.com/genekogan/CubistMirror.
"Prisma" Prisma, prisma-ai.com/.
"Delivering Real-Time AI in the Palm of Your Hand." Facebook Code, code.facebook.com/posts/196146247499076/delivering-real-time-ai-in-the-palm-of-your-hand/.
"Ostagram." Ostagram, www.ostagram.ru/.

* cited by examiner

TRAINING METHOD FOR CONVOLUTIONAL NEURAL NETWORKS FOR USE IN ARTISTIC STYLE TRANSFERS FOR VIDEO

TECHNICAL FIELD

The present invention relates to image and video processing. More specifically, the present invention relates to systems and methods for transforming images from videos such that the end result videos have a distinct style. The style may be copied or transferred from a reference image.

BACKGROUND

The interest in image processing within the past decade has been steadily increasing. Video and image processing has developed to the stage where the general public, equipped with a suitably equipped personal computer or workstation, can now perform seeming magic on images and video.

The use of photo and image editing software packages such as Photoshop has allowed manual photo editing to be in the reach of the general public. When it comes to video, there are also corresponding software packages that would allow the general public to edit, splice, and manipulate videos with the same seeming ease that images can be manipulated.

One challenging field, however, is that of automated video or image editing. While there have been numerous successful attempts at automatically manipulating video and animations, these tend to take a large amount of computing power as well as a large amount of time. The public is aware of what computer generated images (CGI) can do when it comes to cinema. And, equally, a sector of the public is aware of how much resources such special effects can take.

When it comes to automated video processing, one task that is still proving challenging is that of style transfer. Style-transfer consists of modifying pictures or videos so that they acquire the artistic style of a different work. Artistic style refers to the brush, strokes, lines, colours, patterns, motifs, and textures that are specific to a given work of art. While manual style transfer can be easy, high quality automated style transfer, especially when it comes to video, is proving to the difficult.

Currently, automated style transfer methods require too much processing power to be performed in real-time. As well, the results of these methods suffer from temporal instability. Instability can best be explained in terms of its opposite, stability. A stable style transfer means that the style elements will stay in place in the video from frame to frame, relative to the objects in the video or animation. A stable style transfer also means that the style elements will not pop up in one frame and then disappear in the next frame.

It should be clear that current style transfer methods cannot be performed in real-time. By this is meant that these methods cannot effect a style transfer at reasonable resolution (e.g. 850×500 pixels or more) at a reasonable framerate (e.g. 30 fps or more) using a single computer with a high-end GPU card.

To highlight this shortcoming, it has been found that initial work by Gatys (see: https://arxiv.org/abs/1508.06576) as used by Johnson (see https://github.com/jcjohnson/neural-style) results in a frame transformation rate of 1 fps (frames per second). These results were obtained even without frame-to-frame instability.

Another prior art effort in this field can be found at https://github.com/genekogan/CubistMirror. This effort implements the base style-transfer algorithm, without stabilizing the style transfer. In this effort, there is nothing to guarantee the temporal coherence of consecutive frames. As such, the style-transfer is unstable and suffers from stylization features jumping around. As well, stylization features can appear/disappear between frames.

Another prior art effort is detailed at https://prisma-ai.com/. In this effort, the style-transfer is effected but mainly for images, with style transfers occurring within about 10 seconds. However, this effort does not offer style transfers for videos or animations in real-time. As well, the effort does not mention stabilization as there is no need for such with single images.

A further prior art effort is detailed at http://www.ostagram.ru/. Again, this effort only offers style-transfer for images. Based on initial work by Gatys, this effort offers significantly better quality, but does not address stability of video and animations stylization. In addition, this effort is quite slow, with processing taking from 1.5 to 2 hours per image.

There is therefore a need for systems and methods that address the shortcomings of the prior art.

SUMMARY

The present invention provides systems and methods for use in training a convolutional neural network (CNN) for image and video transformations. The CNN is trained by adding noise to training data set images, transforming both the noisy image and the source image, and then determining the difference between the transformed noisy image and the transformed source image. The CNN is further trained by using an object classifier network and noting the node activation levels within that classifier network when transformed images (from the CNN) are classified. By iteratively adjusting the CNN to minimize a combined loss function that includes the differences between the node activation levels for the transformed references images and when transformed source are classified and the differences between the transformed noisy image and the transformed source image, the artistic style being transferred is maintained in the transformed images.

In one aspect, the present invention provides a method for training a neural network for use in copying a specific visual style to multiple images in a sequence of images, the method comprising:

a) applying noise to a source image from said multiple images to result in a noisy image;

b) sending both of said source image and said noisy image through a convolutional neural network to be trained to result in a transformed image and a transformed noisy image;

c) determining a difference between said transformed image and said transformed noisy image;

d) obtaining a reference style image, said reference style image being an image with a style to be transferred to said transformed image;

e) sending said reference style image through a classifier network, said classifier network being a neural network for object recognition, said classifier network having internal nodes that are activated when an image is sent through said classifier network, wherein an object recognized by said classifier network as being in said image sent through said classifier network is dependent upon a level of activation of said internal nodes as said image passes through said classifier network;

f) determining a level of activation of internal nodes in said classifier network when said reference style image passed through said classifier network to result in a first set of node activation levels;

g) sending said transformed image through said classifier network;

h) determining activation levels of internal nodes in said classifier network when said transformed image passed through said classifier network to result in a second set of node activation levels;

i) comparing said first set of node activation levels with said second set of node activation levels to result in a difference of node activation levels;

j) obtaining said source image from said multiple images;

k) sending said source image through said classifier network;

l) determining activation levels of internal nodes at a specific layer in said classifier network when said source image passed through said classifier network to result in a first set of layer node activation levels;

m) obtaining said transformed image and sending said transformed image through said classifier network;

n) determining activation levels of internal nodes at a specific layer in said classifier network when said transformed image passed through said classifier network to result in a second set of layer node activation levels;

o) comparing said first set of layer node activation levels and said second set of layer node activation levels to result in a difference of layer node activation levels;

p) combining said difference of layer node activation levels, said difference of node activation levels, and said difference between said transformed image and said transformed noisy image to result in a sum of loss functions;

q) adjusting at least one parameter in said convolutional neural network;

r) repeating steps a) to p) and comparing said sum of loss functions with previous sums of loss functions until said sum of loss functions has been minimized.

In another aspect, the present invention provides a method for training a convolutional neural network for transforming images from a sequence of images such that resulting images have a desired style, said method using a training set of training images the method comprising:

a1) obtaining a source image from said training set of training images;

a2) applying noise to said source image to result in a noisy image;

a3) sending said source image through said convolutional neural network to result in a transformed image;

a4) sending said noisy image through said convolutional neural network to result in a transformed noisy image;

a5) determining a difference between said transformed image and said transformed noisy image;

a6) adjusting at least one parameter in said convolutional neural network;

a7) repeating steps a3) to a6) and comparing said difference with previous differences until said difference has been minimized.

In a further aspect, the present invention provides non-transitory computer readable media having stored thereon computer readable and computer executable instructions that, when executed, implements a method for training a neural network for use in copying a specific visual style to multiple images in a sequence of images, the method comprising:

a) applying noise to a source image from said multiple images to result in a noisy image;

b) sending both of said source image and said noisy image through a convolutional neural network to be trained to result in a transformed image and a transformed noisy image;

c) determining a difference between said transformed image and said transformed noisy image;

d) obtaining a reference style image, said reference style image being an image with a style to be transferred to said transformed image;

e) sending said reference style image through a classifier network, said classifier network being a neural network for object recognition, said classifier network having internal nodes that are activated when an image is sent through said classifier network, wherein an object recognized by said classifier network as being in said image sent through said classifier network is dependent upon a level of activation of said internal nodes as said image passes through said classifier network;

f) determining a level of activation of internal nodes in said classifier network when said reference style image passed through said classifier network to result in a first set of node activation levels;

g) sending said transformed image through said classifier network;

h) determining activation levels of internal nodes in said classifier network when said transformed image passed through said classifier network to result in a second set of node activation levels;

i) comparing said first set of node activation levels with said second set of node activation levels to result in a difference of node activation levels;

j) obtaining said source image from said multiple images;

k) sending said source image through said classifier network;

l) determining activation levels of internal nodes at a specific layer in said classifier network when said source image passed through said classifier network to result in a first set of layer node activation levels;

m) obtaining said transformed image and sending said transformed image through said classifier network;

n) determining activation levels of internal nodes at a specific layer in said classifier network when said transformed image passed through said classifier network to result in a second set of layer node activation levels;

o) comparing said first set of layer node activation levels and said second set of layer node activation levels to result in a difference of layer node activation levels;

p) combining said difference of layer node activation levels, said difference of node activation levels, and said difference between said transformed image and said transformed noisy image to result in a sum of loss functions;

q) adjusting at least one parameter in said convolutional neural network;

r) repeating steps a) to p) and comparing said sum of loss functions with previous sums of loss functions until said sum of loss functions has been minimized.

BRIEF DESCRIPTION OF THE DRAWINGS

The embodiments of the present invention will now be described by reference to the following figures, in which identical reference numerals in different figures indicate identical elements and in which.

DETAILED DESCRIPTION

It should be clear that the present invention relates to convolutional neural networks and it should be clear to a person skilled in the art that convolutional neural networks are multi-level, multi-layer software constructs that take in input and produces an output. Each level or layer in the neural network will have one or more nodes and each node may have weights assigned to it. The nodes are activated or not depending on how the neural network is configured. The output of the neural network will depend on how the neural network has been configured, which nodes have been activated by the input, and the weights given to the various nodes. As an example, in the field of image identification, an object classifier convolutional neural network will have, as input, an image and the output will be the class of objects to which the item in the image will belong to. In this example, the classifier "recognizes" the item or items in the image and outputs one or more classes of items to which the object or objects in the image should belong to.

It should also be clear that neural network behaviour will depend on how the neural network is "trained". Training involves a data training set that is fed into the neural network. Each set of data is fed into the neural network and the output for each set of training data is then assessed for how close it (the output) is to a desired result. As such, in the example, if an image of a dog is fed into a classifier neural network being trained and the output is "furniture" (i.e. the object in the image (the dog) is to be classified as "furniture"), then clearly the classifier neural network needs further training. Once the output of the neural network being trained has been assessed as to closeness (or distance) from a desired result, then the parameters within the neural network are adjusted. The training data set is then, again, sent to the neural network and the output is, again, assessed to determine distance from or closeness to the desired result. The process is iteratively repeated until the output is acceptably close to the desired result. The adjustments and/or parameters of the neural network that produced the result that is acceptable are then saved. A new data training set can then be used for more training so that the output or result is even closer to the desired result.

As can be imagined, depending on the configuration of the neural network, there could be hundreds of levels or layers within the network, with each layer having potentially hundreds of nodes. Since each node may have a weight associated with it, there could be thousands if not millions of potential parameters that can be adjusted during training. The weight associated with each node may be adjusted to emphasize the node's effect or it may be adjusted to de-emphasize that nodes effect or to even negate whatever effect the node may have. Of course, each node may be one in a decision tree towards an outcome or each node may be a step that effects a change on some piece of data (e.g. the input). In the present invention, since the convolutional neural network being trained transforms an image (or a frame from a video) to one that has a specific style, a node may change the parameters of a pixel in the image (e.g. color, contrast, balance, etc.).

As noted above, the present invention seeks to train a convolutional neural network such that the trained neural network would accept an input video's many frames, adjust those frames, and produce output images that, when recombined to form a transformed video, will have a certain visual style that is consistent within the transformed video. Not only that, but the visual style in the transformed video would be stable across its various frames.

Figure 1:
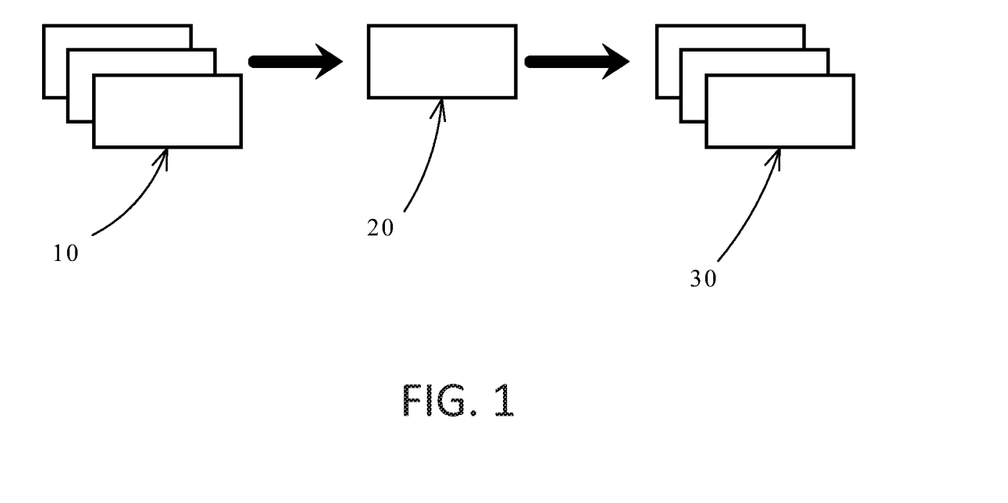
FIG. 1 schematically shows a process that an image undergoes using a trained convolutional neural network (CNN)

With the above in mind, FIG. 1 schematically shows the process that an image will undergo using the trained convolutional neural network (CNN). A set of source images 10 are fed into a convolutional neural network (i.e. a transformation network) 20 to produce a set of transformed images 30. Of course, the source images are the frames from a video and the transformed images can be placed together to form a transformed video.

Figure 2:
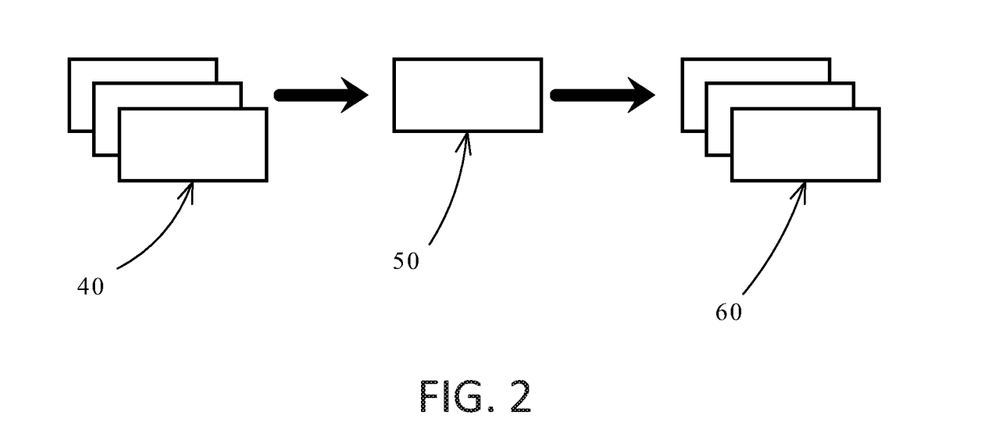
FIG. 2 schematically shows a training process for a CNN.

To train the CNN to produce the desired transformed video, a process similar to that in FIG. 1 is used (see FIG. 2). A set of training source images 40 is sent through a CNN 50 being trained and this produces transformed images 60. These transformed images are assessed in terms of the style being transferred as well as the stability of that transfer (e.g. are the style artefacts being consistently applied to the frames? Is there consistency between frames in terms of what has been changed/transformed?). Based on the results of the assessment, the parameters of the CNN being trained are then adjusted. The set of training source images 40 is then sent through the CNN with the adjusted parameters and the resulting transformed images are again assessed. As noted above, the process is repeated iteratively until the CNN produces results that are acceptable (i.e. the CNN performs to a level that is desired).

Figure 3:
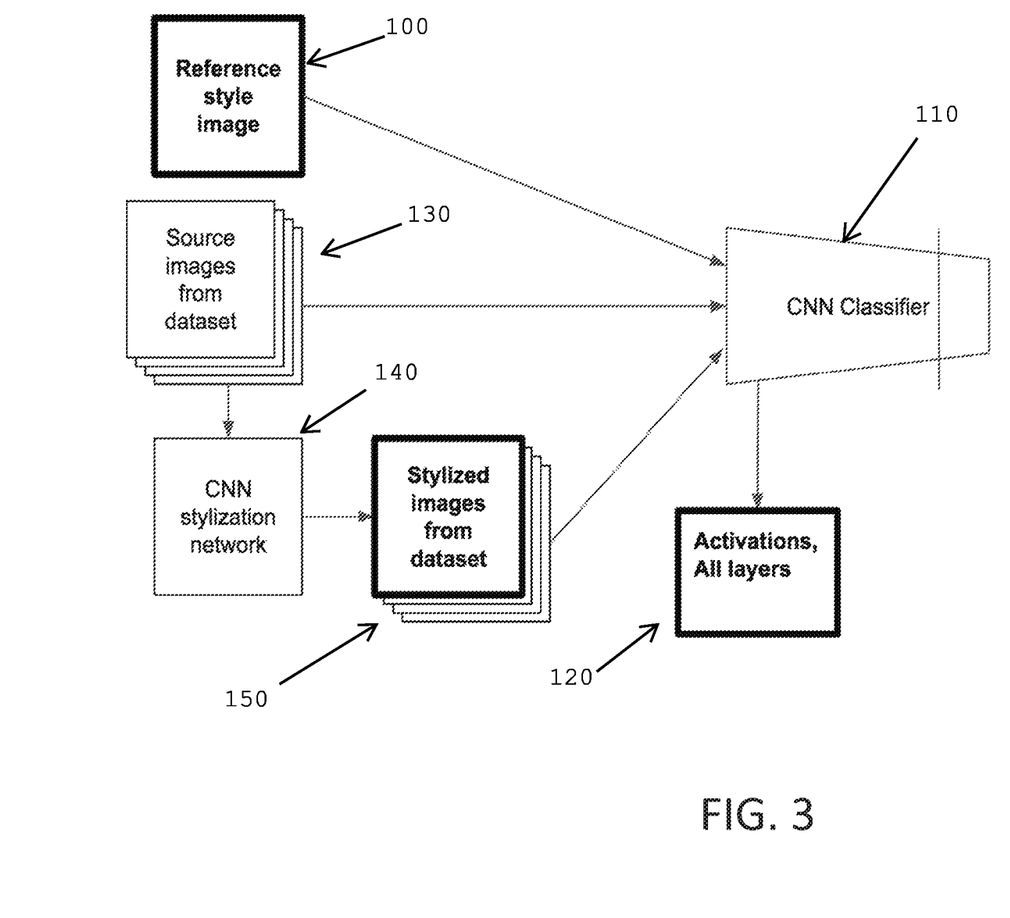
FIG. 3 illustrates one training method for a CNN according to one aspect of the invention.

In one aspect, the present invention trains the CNN with the help of a classifier network. As noted above, such a classifier neural network outputs the class or category of the objects in an input image with a view towards identifying the object. Referring to FIG. 3, this training process is schematically illustrated. As can be seen from FIG. 3, a reference style image 100 (i.e. an image having the style to be transferred to the video being transformed) is passed through the classifier network 110. The activation levels of all the nodes (in all the layers) within the classifier network 110 when the reference style image 100 passes through is noted and saved 120 as a first set of node activation levels. Then, source images from a training data set of images 130 are passed through the CNN being trained 140 to result in transformed training images 150. The transformed training images 150 are then, separately from the reference style image 100, passed through the classifier network 110. The activation levels of all the nodes in all the layers within the classifier network 110 as the transformed training images 150 are passing through are noted and saved 120 as a second set of node activation levels. These two sets of node activation levels are then compared and the differences noted. The CNN to be trained is then adjusted (i.e. its parameters are adjusted) and the process repeated iteratively until the difference between the two sets of node activation levels are at a minimum.

It should be clear that the concept behind this training method is to adjust the CNN until the transformed images it produces are, as much as possible, treated in a similar manner as the reference style image by a classifier network. This would mean that, as an ideal, the classifier network recognizes and decides that the features in the reference style image and in the transformed image are similar and are to be treated and dealt with similarly. This method is designed to ensure that the artistic style from the reference style image is maintained in the transformed images.

Figure 4:
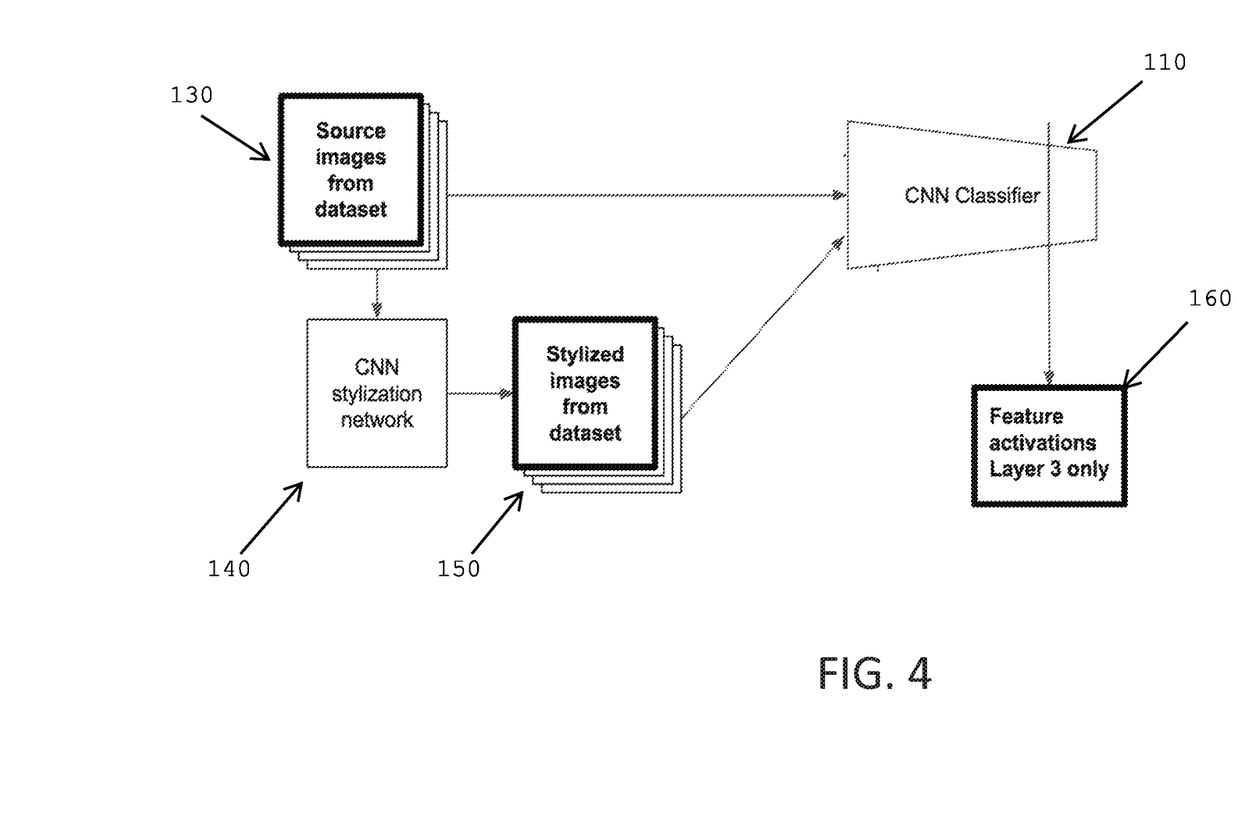
FIG. 4 illustrates another training method for a CNN according to another aspect of the invention.

In another aspect, the present invention trains the CNN again with the help of a classifier network. Referring to FIG. 4, this method is schematically illustrated. As can be seen, source images 130 from a data training set are sent to a classifier network 110. The activation levels of nodes in a specific layer in the classifier network 110 as the source images are passing through are noted to result in a first set of layer node activation levels. The source images 130 are then passed through the CNN being trained 140 to result in transformed images 150. These transformed images 150 are also passed through the classifier network 110. As these transformed images 150 pass through the classifier network 110, the activation levels in nodes in a specific layer within the classifier network 110 are noted to result in a second set of layer node activation levels. The first and second sets of layer node activation levels are compared and the differences noted or saved. The CNN parameters are then adjusted and the process repeated iteratively until these differences between the first and second sets of layer node activation levels are minimized (i.e. until the differences between the first and second set of layer activated nodes are at a minimum).

It should be clear that the concept behind this training method is to adjust the CNN until the source images and the transformed images are recognized and treated by the classifier network as being similar. In one implementation, the activation levels of nodes in layer 3 of the classifier network are noted. For other implementations, the relevant nodes whose activation layers are made note of may be at a different layer. The monitoring of the activation levels of nodes may be for later or higher layers (as opposed to earlier or lower layer) in the classifier network. This method ensures that the features of the source images are maintained, at a high level, within the transformed images.

It should also be clear that while the above description notes the use of a classifier network, other object classification neural network may be used with similar or comparable results. For this implementation, the VGG-16 classifier network (a 16 layer or 16 level neural network) from the Visual Geometry Group from Oxford University was used.

Figure 5:
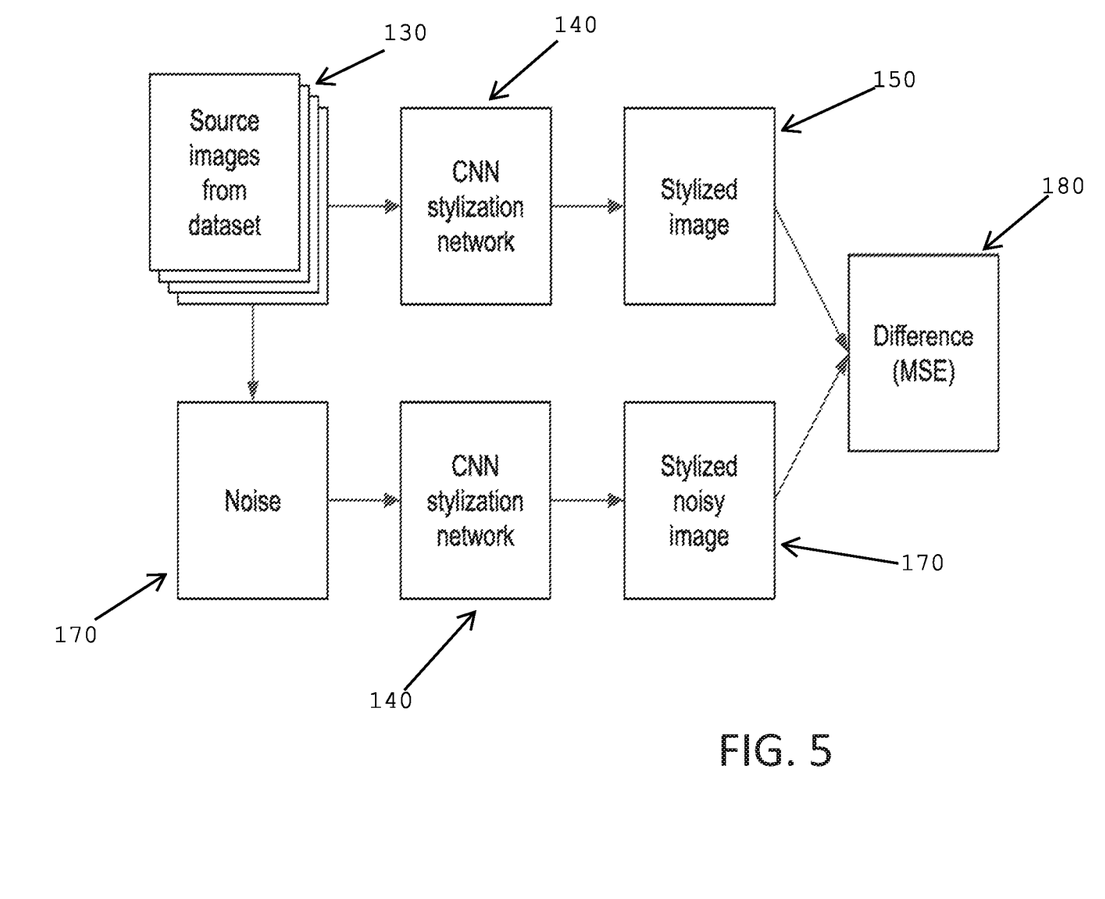
FIG. 5 illustrates a third training method for a CNN according to a further aspect of the invention.

In a further aspect, the present invention trains the CNN to ensure stability across multiple frames in a video. This is done by adding noise to the source images used for training. Referring to FIG. 5, this method starts with the source images 130 from a data training set. Noise 170 is then added to the source image 130 and the resulting noisy image is then passed through the CNN being trained 140. The result is a transformed noisy image 170. The original source image 130 is then passed through the same CNN being trained 140 (separate from the noisy image) and the result is the transformed image 150. A difference 180 between the transformed image and the transformed noisy image 170 is then taken. The CNN parameters are then adjusted and the process is repeated iteratively with the difference between successive iterations being compared. The process continues until the difference between the transformed image and the transformed noisy image is minimized or is at a minimum. Of course, as can be imagined the CNN parameters adjusted after one iteration is used for the next iteration to determine if the adjustments have lowered this difference between the transformed image and the transformed noisy image.

In one implementation, this difference can be the mean square error between the transformed image and the transformed noisy image. The concept behind this method is to train the CNN such that the transformations it applies to the input images are not those that overly amplify changes to a few pixels. This is because a stabilization that produces similar stylization for noisy images should also produce a similar stylization for temporally coherent images (e.g. video frames).

It should be noted that the noise applied to the source image is not simply random noise but noise that has a number of user configurable parameters. These parameters may include:
  noise weight: how much weight to give to stability loss
    relative to other losses such as feature loss and style
    loss
  noise level: how much the noisy levels may vary during
    training. This value controls the amount of variation in
    each of the three color components (Red, Green, Blue)
    in the image to which noise is being added
  noise count: how many pixels to modify in each image
    during training In one implementation, the noise parameters used were able to produce a CNN that produced stable video stylization suitable for real-time use. In this implementation, the noise count was set at 1000 pixels (for a 512×512 pixel image) and noise level was set to 30 for colors in the range of 0-255.

It should also be noted that while the above description explains each of the three training methods separately, these can be combined into a single implementation. For such an implementation, the source images can be passed through the CNN and the resulting transformed image can be used in the three methods as necessary. The other data and transformed images used by the various methods (e.g. the noisy image, the noisy transformed image, and the sets of activation levels of nodes from the classifier network) can be produced and gathered separately. Once all the data and the comparisons between the data have been performed, the CNN being trained can have its parameters adjusted. Once the CNN parameters have been adjusted, the process can be iteratively repeated until the various loss functions or the various differences noted above have been minimized.

Figure 6:
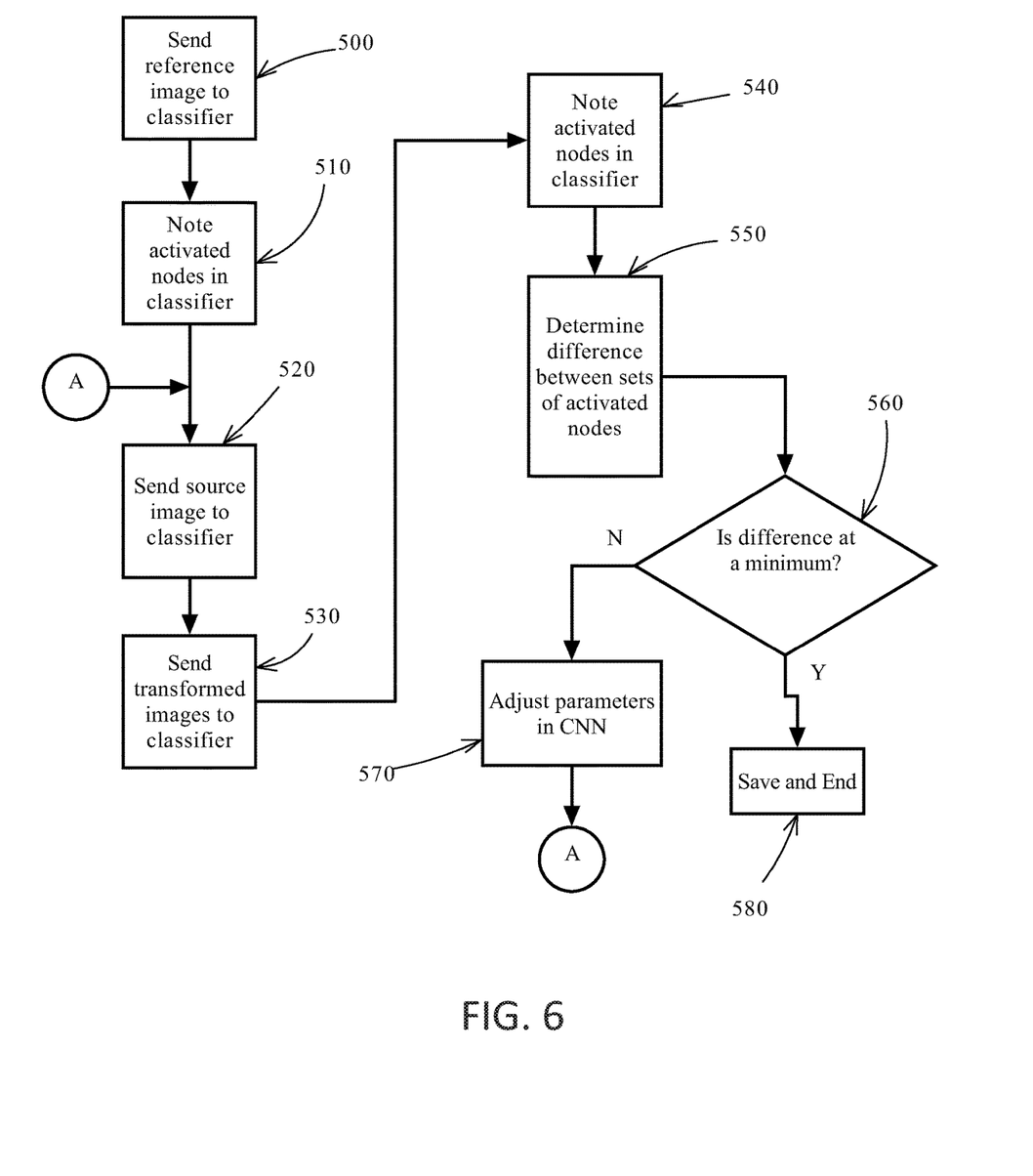
FIG. 6 is a flowchart detailing the steps in the method illustrated in FIG. 5.
Figure 7:
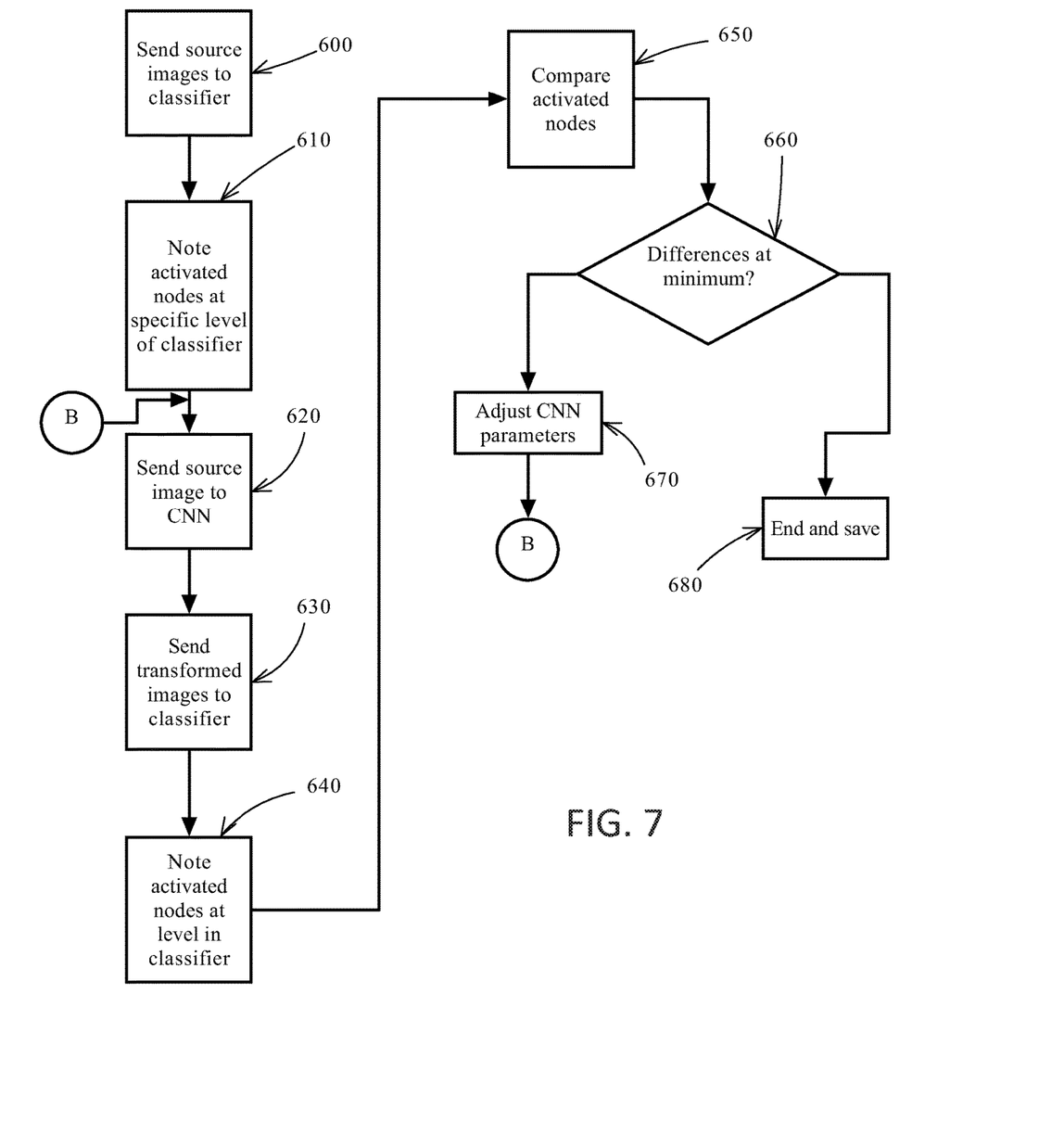
FIG. 7 is a flowchart detailing the steps in the method illustrated in FIG. 4.
Figure 8:
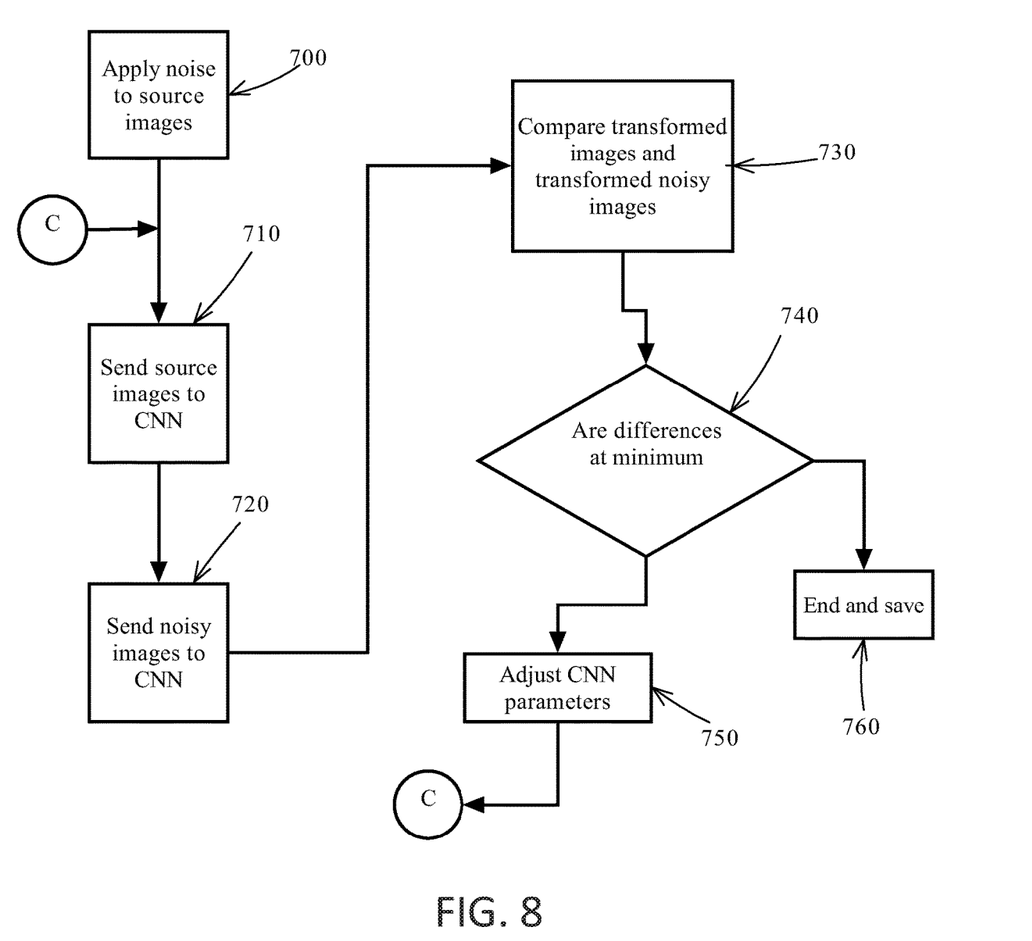
FIG. 8 is a flowchart detailing the steps in the method illustrated in FIG. 6.

The methods above can be summarized in the flowchart detailed in FIGS. 6-8. In FIG. 6, the method involving the classifier network starts at step 500, that of sending the reference style image to the classifier network. The activation levels of nodes in the classifier network are then noted (step 510). The source images are then sent to the CNN to be trained (step 520). The resulting transformed images are then sent to the classifier network (step 530). The activation levels of nodes in the classifier network are then noted (step 540). The difference between the activation levels of the classifier nodes when the reference style image passed through the classifier network and the activation levels of the nodes in the classifier network when the transformed images passed through is noted (Step 550). Alternatively, this can be considered to be a comparison step to determine this difference between the two sets of activation levels. A decision 560 then determines if this difference is at a minimum. If the difference is not at a minimum, the CNN's parameters are then adjusted (step 570) and the logic loops back at connector A to step 520. If the difference is at a minimum, then the process can stop (step 580) or the parameters that produced the minimum difference can be saved.

In FIG. 7, the other training method involving a classifier network is detailed in the flowchart. The process starts at step 600, that of sending the source images from the training data set to the classifier network. In step 610, the activation levels of nodes in a specific layer in the classifier are noted for the source image. The source image is then also sent to the CNN being trained (step 620). The resulting transformed images are then sent to the classifier network (step 630). The activation levels of nodes in a specific layer in the classifier network by the transformed images are then noted (step 640). Step 650 compares the two sets of layer node activation levels to determine the differences. Step 660 then determines if these differences are at a minimum. If the differences are not at a minimum, then the CNN parameters are adjusted (step 670) and the logic loops back to step 620. On the other hand, if the differences are at a minimum, then the process ends and the parameters that produced the minimal differences are stored (step 680).

In FIG. 8, the training method involving the use of noise is detailed in the flowchart. The method begins at step 700, that of applying noise to the source images to result in noisy images. In step 710, the source images are sent to the CNN being trained to result in transformed images. Step 720 is that of sending the noisy images to the CNN being trained to result in transformed noisy images. The transformed noisy images and the transformed images are then compared in step 730 to determine any differences. Step 740 decides if these differences are at a minimum. If these differences are not at a minimum, then the parameters for the CNN are adjusted (step 750) and the logic loops back to step 710. On the other hand, if the differences are at a minimum, then the process may end (step 760) and the parameters that produced this minimum in differences can be saved.

It should be clear that while the various training regimens illustrated in FIGS. 6-8 are explained as being separate processes, these may be implemented in a single system such that all three regimens are executed in parallel.

Figure 9:
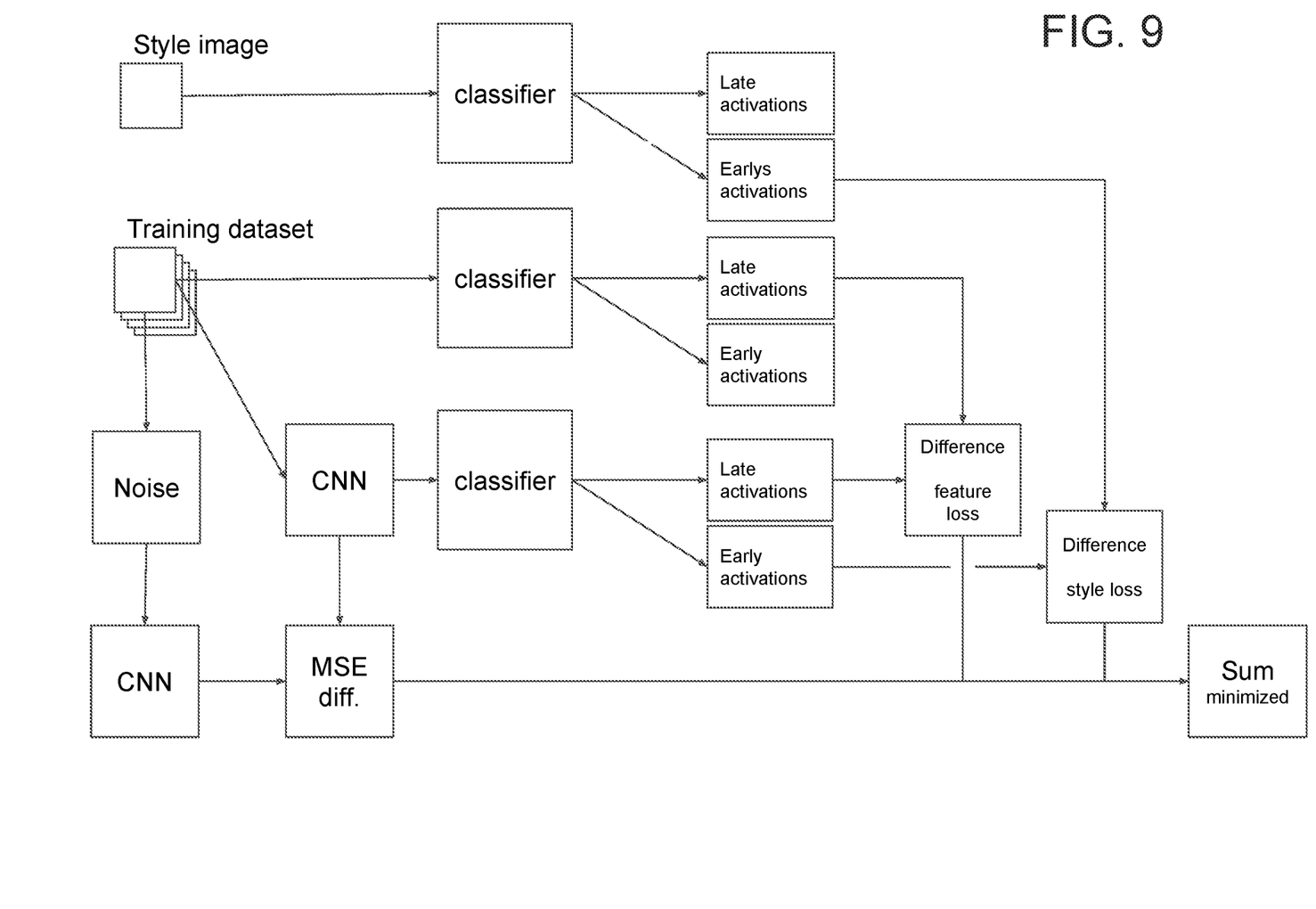
FIG. 9 is a block diagram of a flowchart illustrating an embodiment of the present invention where all three training methods are implemented by a single system.

To clarify one implementation of the present invention, FIG. 9 is provided. As can be seen, FIG. 9 shows a schematic diagram illustrating how a single system can implement all three training methods outlined above. It should be clear that the classifiers in FIG. 9 are similar classifiers and are the classifiers detailed above. As well, the convolutional neural networks (CNN) in FIG. 9 are those that are being trained as noted above. In FIG. 9, the reference style image is sent to a classifier and the activation levels of all the nodes in the various levels are noted. This is illustrated in the Figure as extracting which nodes are late activations or early activations. At the same time, the training data set images are sent to both the classifier and the CNN while a third thread adds noise to the training data set image. The noisy image that results is sent to the CNN. The result of the CNNs from the noisy image and the training data set image are then analyzed to determine the mean square error (MSE) between the two. In addition, the result of the CNN from the training data set image is also sent to a classifier while the training data set image is similarly sent to a classifier. The activation levels of the various nodes in the classifier are then made note of (see late and early activation boxes in FIG. 9).

For feature loss, the differences in late activations between the data set→CNN→classifier chain and the data set→classifier chain are determined. For style loss, the differences between the early activations of the style image-→classifier chain and early activations of the data set-→CNN→classifier chain are determined. These differences are combined with each other and the mean square error to produce a sum. Once the sum is produced, the parameters in the CNN are then adjusted and the process is repeated until the sum is minimized. The sum therefore acts as a combined loss function whose minimization is sought at every iteration after the CNN parameters have been adjusted.

For clarity, the terms "early activation" and "late activation" are to mean that, in a chain of calculations or computations, the early activations are the values at the beginning or near the beginning of the chain while the late activations are those values at the end of or close to the end of the chain. Thus, assuming values u0, u1, u2 are used to compute v1, v2, v3 and assuming v1, v2, v3 are used to calculate w1, w2, w3 and assuming w1, w2, w3 are used to calculate x1, x2, x3 and assuming x1, x2, x3 are used to calculate y1, y2, y3, and assuming y1, y2, y3 are used to calculate z1, z2, z3 then one can determine late and early activations. Early activations would be the values at the beginning of the chain, i.e. u1, u2, u3, v1, v2, v3, w1, w2, and w3. Similarly, late activations would be the values at the end of the chain, i.e. x1, x2, x3, y1, y2, y3, and z1, z2, z3. Early activations, in this document and in the context of the present invention, can mean the activations of neurons located at the beginning of the flow through the convolutional neural network.

It should be clear that the methods detailed above may be implemented using one or more processors installed on one or more computing devices such as personal computers, servers, and the like. Such devices would include storage systems that included both volatile and non-volatile memory and storage devices.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A method for training a neural network for use in copying a specific visual style to multiple images in a sequence of images, the method comprising:
   (a) applying noise to a source image from said multiple images to result in a noisy image;
   (b) sending both of said source image and said noisy image through a convolutional neural network to be trained to result in a transformed image and a transformed noisy image;
   (c) determining a difference between said transformed image and said transformed noisy image;
   (d) obtaining a reference style image, said reference style image being an image with a style to be transferred to said transformed image;
   (e) sending said reference style image through a classifier network, said classifier network being a neural network for object recognition, said classifier network having internal nodes that are activated when an image is sent through said classifier network, wherein an object recognized by said classifier network as being in said image sent through said classifier network is dependent upon a level of activation of said internal nodes as said image passes through said classifier network;
   (f) determining a level of activation of internal nodes in said classifier network when said reference style image passed through said classifier network to result in a first set of node activation levels;
   (g) sending said transformed image through said classifier network;
   (h) determining activation levels of internal nodes in said classifier network when said transformed image passed through said classifier network to result in a second set of node activation levels;
   (i) comparing said first set of node activation levels with said second set of node activation levels to result in a difference of node activation levels;
   (j) obtaining said source image from said multiple images;
   (k) sending said source image through said classifier network;
   (l) determining activation levels of internal nodes at a specific layer in said classifier network when said source image passed through said classifier network to result in a first set of layer node activation levels;
   (m) obtaining said transformed image and sending said transformed image through said classifier network;
   (n) determining activation levels of internal nodes at a specific layer in said classifier network when said transformed image passed through said classifier network to result in a second set of layer node activation levels;
   (o) comparing said first set of layer node activation levels and said second set of layer node activation levels to result in a difference of layer node activation levels;
   (p) combining said difference of layer node activation levels, said difference of node activation levels, and said difference between said transformed image and said transformed noisy image to result in a sum of loss functions;
   (q) adjusting at least one parameter in said convolutional neural network; and
   (r) repeating steps (a) to (p) and comparing said sum of loss functions with previous sums of loss functions until said sum of loss functions has been minimized,
   wherein said noise applied in step (a) has at least one user adjustable parameter.

2. The method according to claim 1, wherein said at least one user adjustable parameter is noise weight, said noise weight being a level of weight given to stability loss relative to either of feature loss or style loss.

3. The method according to claim 1, wherein said difference of layer node activation levels is a mean square error between said transformed image and said transformed noisy image.

4. The method according to claim 1, wherein said classifier network is a 16 layer classifier neural network.

5. The method according to claim 1, wherein said sequence of images is from a section of video frames.

6. A method for training a convolutional neural network for transforming images from a sequence of images such that resulting images have a desired style, said method using a training set of training images the method comprising:
   a1) obtaining a source image from said training set of training images;
   a2) applying noise to said source image to result in a noisy image;
   a3) sending said source image through said convolutional neural network to result in a transformed image;
   a4) sending said noisy image through said convolutional neural network to result in a transformed noisy image;
   a5) determining a difference between said transformed image and said transformed noisy image;
   a6) adjusting at least one parameter in said convolutional neural network;
   a7) repeating steps a3) to a6) and comparing said difference with previous differences until said difference has been minimized,
   wherein said noise applied in step a2) has at least one user adjustable parameter; and wherein said method further comprises:
   (b1) obtaining a reference style image, said reference style image being an image with a style to be transferred to said transformed image;
   (b2) sending said reference style image through a classifier network, said classifier network being a neural network for object recognition, said classifier network having internal nodes that are activated when an image is sent through said classifier network, wherein an object recognized by said classifier network as being in said image sent through said classifier network is dependent upon a level of activation of said internal nodes as said image passes through said classifier network;

(b3) determining a level of activation of internal nodes in said classifier network when said reference style image passed through said classifier network to result in a first set of node activation levels;

(b4) sending said transformed image through said classifier network;

(b5) determining activation levels of internal nodes in said classifier network when said transformed image passed through said classifier network to result in a second set of node activation levels;

(b6) comparing said first set of node activation levels with said second set of node activation levels to result in a difference of node activation levels;

(b7) adjusting at least one parameter in said convolutional neural network and sending said source image through said convolutional neural network to result in a new transformed image; and (b8) repeating steps (b4) to (b7) until said difference in node activation levels is at a minimum.

7. The method according to claim 6, wherein the method further comprises repeating steps a1) to a7) for multiple images from said training set of training images such that parameters for said convolutional neural network that resulted in a minimized difference for one image from said set of training images is used for at least one other image from said training set of training images.

8. The method according to claim 6, further comprising:
b9) saving parameters for said convolutional neural network that resulted in a minimum difference in node activation levels.

9. The method according to claim 6, further comprising:
b9) repeating steps b4) to b8) for multiple transformed images, each of said multiple transformed images being a result of sending a different source image through said convolutional neural network such that parameters for said convolutional neural network that resulted in said minimum difference for node activation levels for one transformed image is used for at least one other transformed image.

10. A method for training a convolutional neural network for transforming images from a sequence of images such that resulting images have a desired style, said method using a training set of training images, the method comprising:
a1) obtaining a source image from said training set of training images;
a2) applying noise to said source image to result in a noisy image;
a3) sending said source image through said convolutional neural network to result in a transformed image;
a4) sending said noisy image through said convolutional neural network to result in a transformed noisy image;
a5) determining a difference between said transformed image and said transformed noisy image;
a6) adjusting at least one parameter in said convolutional neural network;
a7) repeating steps a3) to a6) and comparing said difference with previous differences until said difference has been minimized,
wherein said noise applied in step a2) has at least one user adjustable parameter; and
wherein said method further comprises:
(c1) obtaining said source image from said training set;
(c2) sending said source image through a classifier network, said classifier network being a neural network for object recognition, said classifier network having internal nodes that are activated when an image is sent through said classifier network, wherein an object recognized by said classifier network as being in said image sent through said classifier network is dependent upon a level of activation of internal nodes as said image passes through said classifier network;

(c3) determining activation levels of internal nodes at a specific layer in said classifier network when said source image passed through said classifier network to result in a first set of layer node activation levels;

(c4) obtaining said transformed image and sending said transformed image through said classifier network;

(c5) determining activation levels of internal nodes at a specific layer in said classifier network when said transformed image passed through said classifier network to result in a second set of layer node activation levels;

(c6) comparing said first set of layer node activation levels and said second set of layer node activation levels to result in a difference of layer node activation levels;

(c7) adjusting at least one parameter in said convolutional neural network and sending said source image through said convolutional neural network to result in a new transformed image; and (c8) repeating steps (c4) to (c7) until said difference in layer node activation levels is at a minimum.

11. The method according to claim 10, further comprising:
c9) saving parameters for said convolutional neural network that resulted in the minimum in said difference in layer node activation levels.

12. The method according to claim 10, further comprising:
c9) repeating steps c4) to c8) for multiple transformed images, each of said multiple transformed images being a result of sending a different source image through said convolutional neural network such that parameters for said convolutional neural network that resulted in said minimum in difference in layer node activation levels for one transformed image is used for at least one other transformed image.

13. The method according to claim 6, wherein said at least one user adjustable parameter is a noise weight, said noise weight being a level of weight given to stability loss relative to either of feature loss or style loss.

14. The method according to claim 6, wherein said difference is a mean square error between said transformed image and said transformed noisy image.

15. The method according to claim 7, wherein said classifier network is a 16 layer classifier neural network.

16. The method according to claim 6, wherein said sequence of images is from a section of video frames.

17. Non-transitory computer readable media having stored thereon computer readable and computer executable instructions that, when executed, implements a method for training a neural network for use in copying a specific visual style to multiple images in a sequence of images, the method comprising:
(a) applying noise to a source image from said multiple images to result in a noisy image;
(b) sending both of said source image and said noisy image through a convolutional neural network to be trained to result in a transformed image and a transformed noisy image;

(c) determining a difference between said transformed image and said transformed noisy image;
(d) obtaining a reference style image, said reference style image being an image with a style to be transferred to said transformed image;
(e) sending said reference style image through a classifier network, said classifier network being a neural network for object recognition, said classifier network having internal nodes that are activated when an image is sent through said classifier network, wherein an object recognized by said classifier network as being in said image sent through said classifier network is dependent upon a level of activation of said internal nodes as said image passes through said classifier network;
(f) determining a level of activation of internal nodes in said classifier network when said reference style image passed through said classifier network to result in a first set of node activation levels;
(g) sending said transformed image through said classifier network;
(h) determining activation levels of internal nodes in said classifier network when said transformed image passed through said classifier network to result in a second set of node activation levels;
(i) comparing said first set of node activation levels with said second set of node activation levels to result in a difference of node activation levels;
(j) obtaining said source image from said multiple images;
(k) sending said source image through said classifier network;
(l) determining activation levels of internal nodes at a specific layer in said classifier network when said source image passed through said classifier network to result in a first set of layer node activation levels;
(m) obtaining said transformed image and sending said transformed image through said classifier network;
(n) determining activation levels of internal nodes at a specific layer in said classifier network when said transformed image passed through said classifier network to result in a second set of layer node activation levels;
(o) comparing said first set of layer node activation levels and said second set of layer node activation levels to result in a difference of layer node activation levels;
(p) combining said difference of layer node activation levels, said difference of node activation levels, and said difference between said transformed image and said transformed noisy image to result in a sum of loss functions;
(q) adjusting at least one parameter in said convolutional neural network; and
(r) repeating steps (a) to (p) and comparing said sum of loss functions with previous sums of loss functions until said sum of loss functions has been minimized, wherein said noise applied in step (a) has at least one user adjustable parameter.

18. The method according to claim 1, wherein said at least one adjustable parameter is a noise level, said noise level being how much each of three color components can vary in an image.

19. The method according to claim 1, wherein said at least one adjustable parameter is a noise count, said noise count being how many pixels are modified in an image.

20. The method according to claim 6, wherein said at least one adjustable parameter is a noise level, said noise level being how much each of three color components can vary in an image.

21. The method according to claim 6, wherein said at least one adjustable parameter is a noise count, said noise count being how many pixels are modified in an image.

22. A system for training a neural network, said system comprising:
a classifier network comprising at least one classifier, said classifier network being for receiving a reference style image, a training data set comprising multiple images, and a modified version of at least one image from said training data set, wherein noise has been added to said at least one image to thereby produce said modified version of said at least one image; and
a convolutional neural network, wherein at least one of said at least one image, a copy of said at least one image, and said modified version of said at least one image are processed by said neural network before being passed to said classifier network,
wherein said noise has at least one user adjustable parameter, and wherein said system implements a method, wherein said method comprises the steps of:
(a) sending both of said at least one image and said modified version through a convolutional neural network to be trained, to result in a transformed image and a transformed modified version;
(b) determining a difference between said transformed image and said transformed modified version;
(c) obtaining said reference style image, said reference style image being an image with a style to be transferred to said transformed image;
(d) sending said reference style image through said classifier network, said classifier network being a neural network for object recognition, said classifier network having internal nodes that are activated when a specific image is sent through said classifier network, wherein an object recognized by said classifier network as being in said specific image sent through said classifier network is dependent upon a level of activation of said internal nodes as said specific image passes through said classifier network;
(e) determining a level of activation of internal nodes in said classifier network when said reference style image passed through said classifier network to result in a first set of node activation levels;
(f) sending said transformed image through said classifier network;
(g) determining activation levels of internal nodes in said classifier network when said transformed image passed through said classifier network to result in a second set of node activation levels;
(h) comparing said first set of node activation levels with said second set of node activation levels to result in a difference of node activation levels;
(i) obtaining said at least one image from said training data set;
(j) sending said at least one image through said classifier network;
(k) determining activation levels of internal nodes at a specific layer in said classifier network when said at least one image passed through said classifier network to result in a first set of layer node activation levels;
(l) obtaining said transformed image and sending said transformed image through said classifier network;
(m) determining activation levels of internal nodes at a specific layer in said classifier network when said transformed image passed through said classifier network to result in a second set of layer node activation levels;

(n) comparing said first set of layer node activation levels and said second set of layer node activation levels to result in a difference of layer node activation levels;
(o) combining said difference of layer node activation levels, said difference of node activation levels, and said difference between said transformed image and said transformed modified version to result in a sum of loss functions;
(p) adjusting at least one parameter in said convolutional neural network; and
(q) repeating steps (a) to (o) and comparing said sum of loss functions with previous sums of loss functions until said sum of loss functions has been minimized.

23. The system according to claim 22, wherein said method is a method for training a convolutional neural network for transforming images from a sequence of images such that resulting images have a desired style, said method comprising:
   (a) sending said at least one image through said convolutional neural network to result in a transformed image;
   (b) sending said modified version through said convolutional neural network to result in a transformed modified version;
   (c) determining a difference between said transformed image and said transformed modified version; and
   (d) adjusting at least one parameter in said convolutional neural network;
repeating steps (a) to (d) and comparing said difference with previous differences until said difference has been minimized.

* * * * *